(12) United States Patent
Zhu et al.

(10) Patent No.: US 11,044,452 B2
(45) Date of Patent: Jun. 22, 2021

(54) IMAGING SYSTEM AND METHOD

(71) Applicant: SZ DJI TECHNOLOGY CO., LTD., Shenzhen (CN)

(72) Inventors: Zhenyu Zhu, Shenzhen (CN); Honghui Zhang, Shenzhen (CN); Zhiyuan Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 135 days.

(21) Appl. No.: 16/109,211

(22) Filed: Aug. 22, 2018

(65) Prior Publication Data

US 2019/0014303 A1 Jan. 10, 2019

Related U.S. Application Data

(63) Continuation of application No. PCT/CN2016/074520, filed on Feb. 25, 2016.

(51) Int. Cl.
*H04N 13/128* (2018.01)
*H04N 13/271* (2018.01)
(Continued)

(52) U.S. Cl.
CPC .......... *H04N 13/128* (2018.05); *G06T 7/593* (2017.01); *H04N 13/239* (2018.05);
(Continued)

(58) Field of Classification Search
CPC .. C12Q 1/48; C12Q 1/6886; C12Q 2600/106; C12Q 2600/154; C12Q 2600/158;
(Continued)

(56) References Cited

U.S. PATENT DOCUMENTS

| 10,008,027 | B1* | 6/2018 | Baker | G06T 7/50 |
| 2012/0039525 | A1* | 2/2012 | Tian | H04N 13/271 |
| | | | | 382/154 |

(Continued)

FOREIGN PATENT DOCUMENTS

| CN | 101556696 A | 10/2009 |
| CN | 103383776 A | 11/2013 |

(Continued)

OTHER PUBLICATIONS

Stan Birchfield et al., Depth Discontinuities by Pixel-to-Pixel Stereo, Proceedings of the 1998 IEEE International Conference on Computer Vision, Bombay, India Jan. 7, 1998 8 pages.

(Continued)

*Primary Examiner* — Joon Kwon
(74) *Attorney, Agent, or Firm* — Anova Law Group, PLLC

(57) ABSTRACT

A method of distance measuring includes obtaining a depth map and a stereo pair of images of a scene of interest, and enhancing a precision of the depth map based on disparity values of corresponding points between the images. The images have a higher resolution than the depth map. Enhancing the precision of the depth map includes determining the disparity values by optimizing an energy function of the images and replacing low precision values of the depth map with corresponding high precision values based on the disparity values.

20 Claims, 11 Drawing Sheets

(51) Int. Cl.
*H04N 13/239* (2018.01)
*G06T 7/593* (2017.01)
*H04N 13/243* (2018.01)
*H04N 13/00* (2018.01)

(52) U.S. Cl.
CPC ......... *H04N 13/243* (2018.05); *H04N 13/271* (2018.05); *G06T 2207/10012* (2013.01); *G06T 2207/10028* (2013.01); *G06T 2207/10032* (2013.01); *H04N 2013/0081* (2013.01)

(58) Field of Classification Search
CPC ...... G01N 2800/52; G06T 2207/10012; G06T 2207/10028; G06T 2207/10032; G06T 7/593; H04N 13/128; H04N 13/239; H04N 13/243; H04N 13/271; H04N 2013/0081
See application file for complete search history.

(56) References Cited

U.S. PATENT DOCUMENTS

| | | | | |
|---|---|---|---|---|
| 2012/0098932 | A1* | 4/2012 | Kim | G06T 7/593 348/43 |
| 2013/0033713 | A1* | 2/2013 | Patana | G03B 35/26 358/1.9 |
| 2014/0267243 | A1* | 9/2014 | Venkataraman | H04N 13/106 345/419 |
| 2015/0269737 | A1* | 9/2015 | Lam | H04N 13/111 382/154 |
| 2015/0302239 | A1* | 10/2015 | Ohba | G06K 9/00261 382/154 |

FOREIGN PATENT DOCUMENTS

| | | |
|---|---|---|
| CN | 103854257 A | 6/2014 |
| CN | 104756490 A | 7/2015 |
| CN | 105139355 A | 12/2015 |
| TW | 201208344 A | 2/2012 |
| WO | 2013173749 A1 | 11/2013 |

OTHER PUBLICATIONS

The World Intellectual Property Organization (WIPO) International Search Report and Written Opinion for PCT/CN2016/074520 dated Nov. 28, 2016 8 pages.

\* cited by examiner

IMAGING SYSTEM AND METHOD

CROSS-REFERENCE TO RELATED APPLICATION

This application is a continuation of International Application No. PCT/CN2016/074520, filed on Feb. 25, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to digital imaging and more particularly, but not exclusively, to systems and methods for enhancing precision of depth perception in stereoscopic imaging.

BACKGROUND

Stereoscopic imaging, a technique whereby multiple imaging devices are used to form a three dimensional image through stereopsis, is becoming increasingly common in many fields. Stereoscopic imaging is particularly useful in robotics, where it is often desirable to gather three-dimensional information about a machine's environment. Stereoscopic imaging simulates the binocular visions of human eyes, which apply the principle of stereopsis to achieve depth perception. This technique can be reproduced by artificial imaging devices by viewing a given object of interest using multiple imaging devices from slightly different vantage points. Differences between varying views of the object of interest convey depth information about the object, thereby enabling three-dimensional imaging of the object.

The ability of stereoscopic imaging to resolve depth is a function of the resolution of images that are taken from different vantage points and compared. Higher resolution images yields more precise depth measurements. Obtaining greater precision of depth perception is especially important in applications for viewing distant objects, such as in outdoor imaging applications. However, existing methods of determining depth by stereoscopic imaging scale poorly as image resolution increases, and are ill-suited for such imaging applications. Accordingly, there is a need for systems and methods that more efficiently increase depth perception precision in stereo imaging.

SUMMARY

In accordance with a first aspect disclosed herein, there is set forth a method of distance measuring, comprising: obtaining a depth map and a stereo pair of images of a scene of interest, the images having a higher resolution than the depth map; and enhancing a precision of the depth map based on disparity values of corresponding points between the images.

In accordance with another aspect disclosed herein, there is set forth an imaging system, comprising: a pair of imaging devices configured to obtain a stereo pair of images of a scene of interest; and one or more processors configured to enhance a precision of a depth map of the scene of interest based on disparity values of corresponding points between the images, wherein the images have a higher resolution than the depth map.

In accordance with another aspect disclosed herein, there is set forth an apparatus for imaging, comprising one or more processors configured to: obtain a depth map of the scene of interest; obtain a stereo pair of images of a scene of interest, the images having a higher resolution than the depth map; and enhance a resolution of a depth map based on disparity values of corresponding points between the images.

In accordance with another aspect disclosed herein, there is set forth a computer readable storage medium, comprising: instruction for obtaining a depth map and a stereo pair of images of a scene of interest, the images having a higher resolution than the depth map; and instruction for enhancing a resolution of the depth map based on disparity values of corresponding points between the images.

Figure 1:
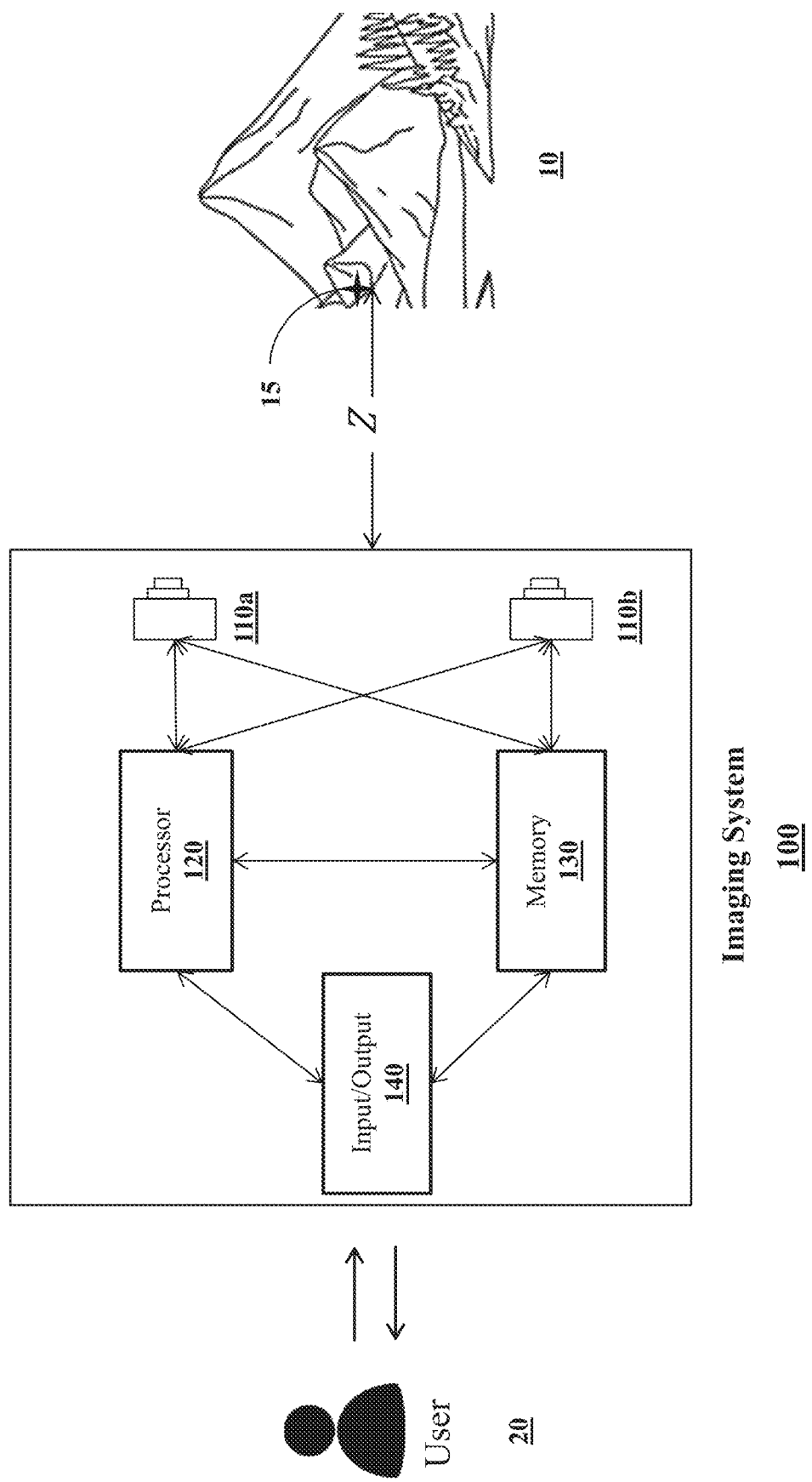
FIG. 1 is an exemplary top-level block diagram illustrating an embodiment of a stereoscopic imaging system including a plurality of imaging devices.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

The present disclosure sets forth systems and methods for enhancing the precision of depth measurements obtained using stereoscopic imaging, which overcome limitations of traditional systems and methods. More particularly, prior systems and methods for finding a disparity between corresponding points in two separate images are inefficient, scaling with the cube of the resolution of the images. For example, increasing image resolution from 320×240 pixels to 640×480 can increase computational costs by a factor of eight, even though the precision of the resulting depth map is increased only by a factor of two. The present systems and methods significantly enhance efficiency of obtaining high precision depth information.

Turning now to FIG. 1, an exemplary imaging system 100 is shown as including a plurality of imaging devices 110a, 110b. The imaging devices 110a and 110b can each be configured to acquire corresponding images 200a, 200b (shown in FIG. 3) of a scene of interest 10. For purposes of stereoscopic depth perception, a disparity d between the positions of an object of interest 15 within the scene of interest 10 can be found by comparison of the images 200a, 200b. The disparity d can be used to find a distance Z between the object of interest 15 and the imaging devices 110a, 110b.

The imaging system 100 can include any number of imaging devices 110, as desired, though two imaging devices 110a and 110b are shown for illustrative purposes only. For example, the imaging system 100 can have 2, 3, 4, 5, 6, or even a greater number of imaging devices 110. The imaging devices 110 can be arranged in any desired manner in the imaging system 100. The specific arrangement of imaging devices 110 can depend on the imaging application. In some embodiments, for example, a pair of imaging devices 110 can be positioned side-by-side as a left imaging device 110a and a right imaging device 110b. In some embodiments, the imaging devices 110a and 110b can be configured to have parallel optical axes (not shown in FIG. 1).

Each imaging device 110 can perform the function of sensing light and converting the sensed light into electronic signals that can be ultimately rendered as an image. Exemplary imaging devices 110 suitable for use with the disclosed systems and methods, include, but are not limited to, commercially-available cameras and camcorders. Suitable imaging devices 110 can include analog imaging devices (for example, video camera tubes) and/or digital imaging devices (for example, charge-coupled device (CCD), complementary metal-oxide-semiconductor (CMOS), N-type metal-oxide-semiconductor (NMOS) imaging devices, and hybrids/variants thereof). Digital imaging devices, for example, can include a two-dimensional grid or array of photosensor elements (not shown) that can each capture one pixel of image information. In some embodiments, each imaging device 110 has a resolution of at least 0.01 Megapixels, 0.02 Megapixels, 0.05 Megapixels, 0.1 Megapixels, 0.5 Megapixels, 1 Megapixel, 2 Megapixels, 5 Megapixels, 10 Megapixels, 20 Megapixels, 50 Megapixels, 100 Megapixels, or an even greater number of pixels. Exemplary image resolutions that can be used for the present systems and methods include 320×240 pixels, 640×480 pixels, 800×600 pixels, 1024×786 pixels, 1280×960 pixels, 1536×1180 pixels, 2048×1536 pixels, 2560×1920 pixels, 3032×2008 pixels, 3072×2304 pixels, 3264×2448 pixels, and other image resolutions.

Each imaging device 110 can also include a lens 105 for focusing light onto the photosensor elements, such as a digital single-lens reflex (DSLR) lens, pin-hole lens, biological lens, simple convex glass lens, macro lens, zoom lens, telephoto lens, fisheye lens, wide-angle lens, or the like.

Each imaging device 110 can also include apparatus (not shown) that separates and/or filters the sensed light based on color and directs the light onto the appropriate photosensor elements. For example, the imaging device 110 can include a color filter array that passes red, green, or blue light to selected pixel sensors and forms an interlaced color mosaic grid in a Bayer pattern. Alternatively, for example, each imaging device 110 can include an array of layered pixel photosensor elements that separates light of different wavelengths based on the properties of the photosensor elements.

Each imaging device 110 can have specialty functions for use in various applications such as thermography, creation of multi-spectral images, infrared detection, gamma detection, x-ray detection, and the like. Each imaging device 110 can include, for example, electro-optical sensors, thermal/infrared sensors, color or monochrome sensors, multi-spectral imaging sensors, spectrophotometers, spectrometers, thermometers, and/or illuminometers.

As shown in FIG. 1, the imaging devices 110 can interface with one or more processors 120. Although a single processor 120 is shown for illustrative purposes only, the imaging system 100 can include any number of processors 120, as desired. Without limitation, each processor 120 can include one or more general purpose microprocessors (for example, single or multi-core processors), application-specific integrated circuits (ASIC), field-programmable gate arrays (FPGA), application-specific instruction-set processors, digital signal processing units, coprocessors, network processing units, audio processing units, encryption processing units, and the like. In certain embodiments, the processor 120 can include an image processing engine or media processing unit, which can include specialized hardware for enhancing the speed and efficiency of focusing, image capture, filtering, Bayer transformations, demosaicing operations, noise reduction operations, image sharpening operations, image softening operations, and the like. The processors 120 can be configured to perform any of the methods described herein, including but not limited to a variety of operations relating to stereoscopic imaging and/or depth precision enhancement. In some embodiments, the processors 120 can include specialized software and/or hardware for processing operations relating to stereoscopic imaging and/or depth precision enhancement.

In some embodiments, the processor 120 is physically located adjacent to the imaging devices 110, in which case data between the processor 120 and the imaging devices 110 can be communicated locally. An advantage of local communication is that transmission delay can be reduced to facilitate real-time image processing, and depth precision enhancement. In other embodiments, the processor 120 can be located remotely from the imaging devices 110. Remote processing may be preferable, for example, because of weight restrictions or other reasons relating to an operational environment of the imaging system 100. As a non-limiting example, if the imaging devices 110 are mounted aboard a mobile platform, such as an unmanned aerial vehicle 50 (UAV) (shown in FIG. 10), conveying imaging data to a remote terminal (not shown) for centralized processing, such as a ground terminal or base station, can be desirable. Various communication protocols can be used for remote communication between the imaging devices 110 and the processors 120, such as Suitable communication protocols include, for example, radio, Wireless Fidelity (Wi-Fi), cellular, satellite, broadcasting, and others.

Figure 2:
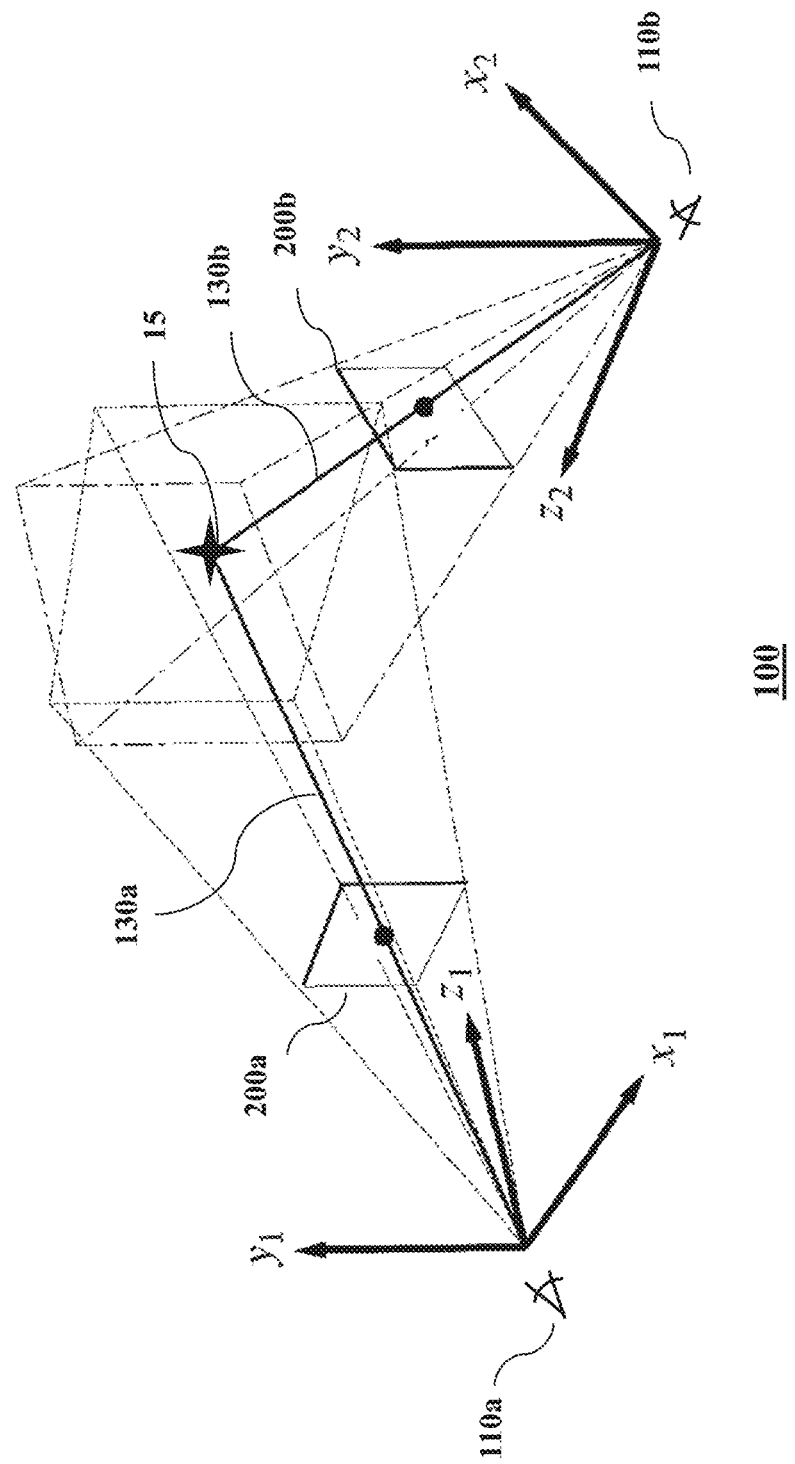
FIG. 2 is an exemplary diagram illustrating the stereoscopic imaging system of FIG. 1 as used in determining an object distance using triangulation.

As shown in FIG. 2, the imaging system 100 can include one or more memories 130 (alternatively referred to herein as a computer readable storage medium). Suitable memories 130 can include, for example, random access memory (RAM), static RAM, dynamic RAM, read-only memory (ROM), programmable ROM, erasable programmable ROM, electrically erasable programmable ROM, flash memory, secure digital (SD) card, and the like. Image data from the imaging devices 110a, 110b can be transmitted to and stored within the memory 130. The memory 130 can also be used to store a depth map (for example, a depth map 300 shown in FIG. 4) both prior to and after depth precision enhancement. Furthermore, instruction for performing any of the methods described herein can be stored in the memory 130. The memory 130 is in operative communication with the processors 120, and instructions can be transmitted from the memory 130 to the processors 120 for execution.

Data from the processors 120 and/or the memories 130 can be communicated with one or more input/output devices 140 (for example, buttons, a keyboard, keypad, trackball, displays, and/or a monitor). The input/output devices 140 can each have a suitable interface to deliver content to a user 20. The input/output devices 140 can be used to provide a user interface for interacting with the user 20 to obtain images and control a process for enhancing depth precision. Various user interface elements (for example, windows, buttons, menus, icons, pop-ups, tabs, controls, cursors, insertion points, and the like) can be used to interface with the user 20. The video synchronization system 100 can further include one or more additional hardware components (not shown), as desired.

Turning now to FIG. 2, a method of ascertaining an object distance Z using stereoscopic imaging is illustrated therein with reference to two imaging devices 110: a left imaging device 110a; and a right imaging device 110b. Each of the imaging devices 110a and 110b perceives the same object of interest 15, but in different spatial coordinates as illustrated by the coordinate axes $(x_1, y_1, z_1)$ and $(x_2, y_2, z_2)$. The imaging devices 110a and 110b perceive the object of interest 15 along respective optical axes 130a and 130b and thereby arrive at two different two-dimensional images 200a and 200b of the same object of interest 15. The two-dimensional images 200a and 200b are typically different, being taken from different positions, unless the imaging devices 110a and 110b are positioned such that their optical axes 130a and 130b coincide. Accordingly, under most circumstances, a disparity d can be found between the corresponding positions of the object of interest 15 within the images 200a and 200b.

Figure 3:
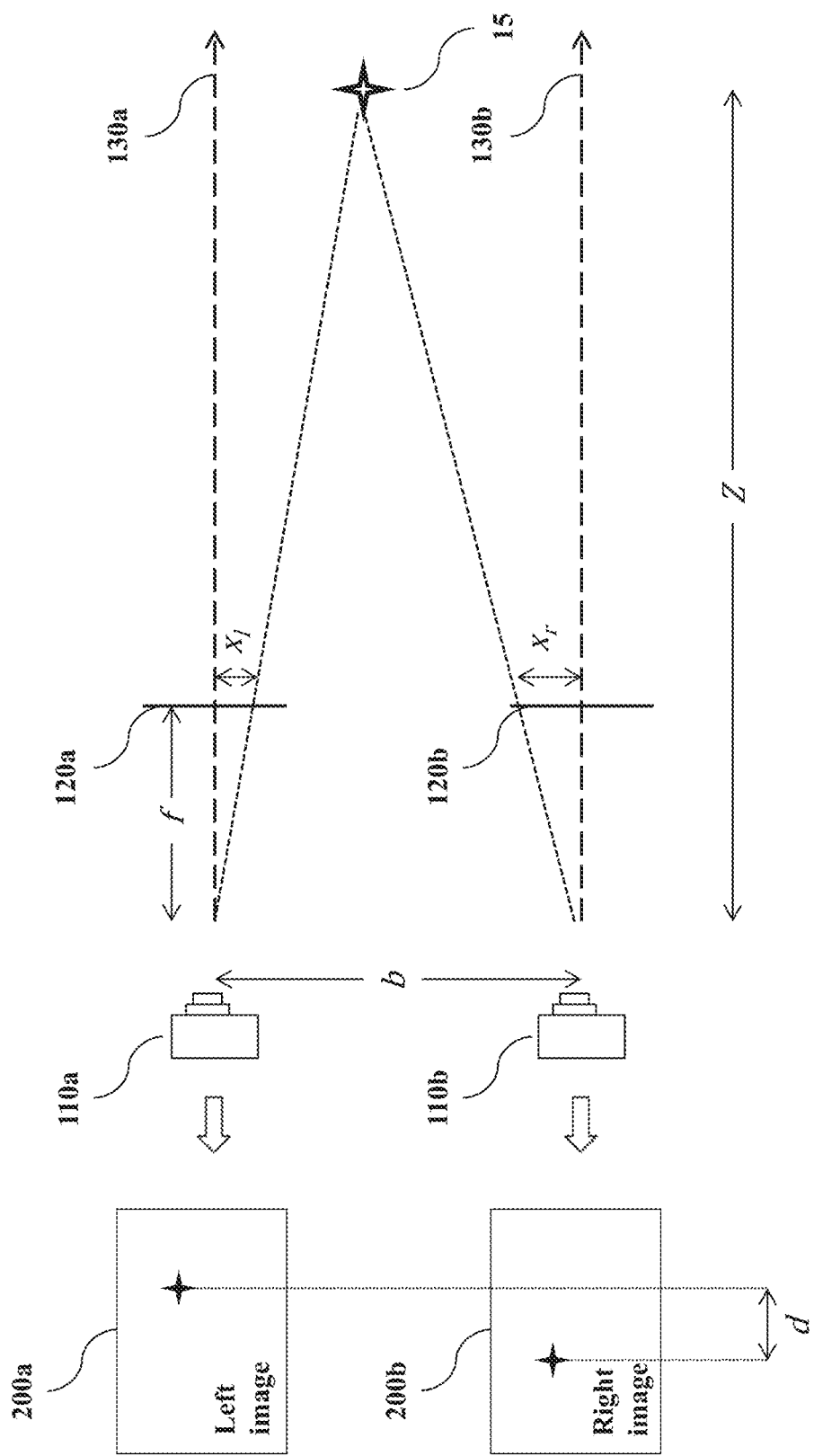
FIG. 3 is an exemplary diagram illustrating the stereoscopic imaging system of FIG. 1 as used in determining an object distance using triangulation based on a disparity.

Turning now to FIG. 3 to further illustrate depth measurement using stereoscopic imaging, a left image 200a and right image 200b can be compared to ascertain an object distance Z between a pair imaging devices 110a and 110b (or equivalently, the imaging system 100) and the object of interest 15. A method of triangulation can be used to ascertain the object distance Z using a disparity d between the images 200a, 200b for each object of interest 15 within a scene of interest 10. Specifically, the position of a particular object of interest 15 having an index i, represented by coordinates $(X_i, Y_i, Z_i)$, can be given as follows:

$$X_i = \frac{b}{d}(x_i^l - c_x), \quad \text{Equation (1)}$$

$$Y_i = \frac{b}{d}(y_i^l - c_y), \quad \text{Equation (2)}$$

$$Z_i = \frac{b}{d}f \quad \text{Equation (3)}$$

where $c_x$ and $c_y$ represent respective center coordinates of the imaging devices 110a and 110b, $x_i$ and $y_i$ represent the coordinates of the object 150 of interest in one or both of the images 200a and 200b, b is the baseline (in other words, the distance between the center coordinates of the imaging devices 110a and 110b), f is the focal length of each imaging devices 110a and 110b (assuming here that the imaging devices have the same focal length), i is an index over the objects of interest 15, and $d_i$ is the disparity of the object of interest 15 between the images 200a and 200b, represented as:

$$d_i = x_i^l - x_i^r. \quad \text{Equation (4)}$$

Figure 4:
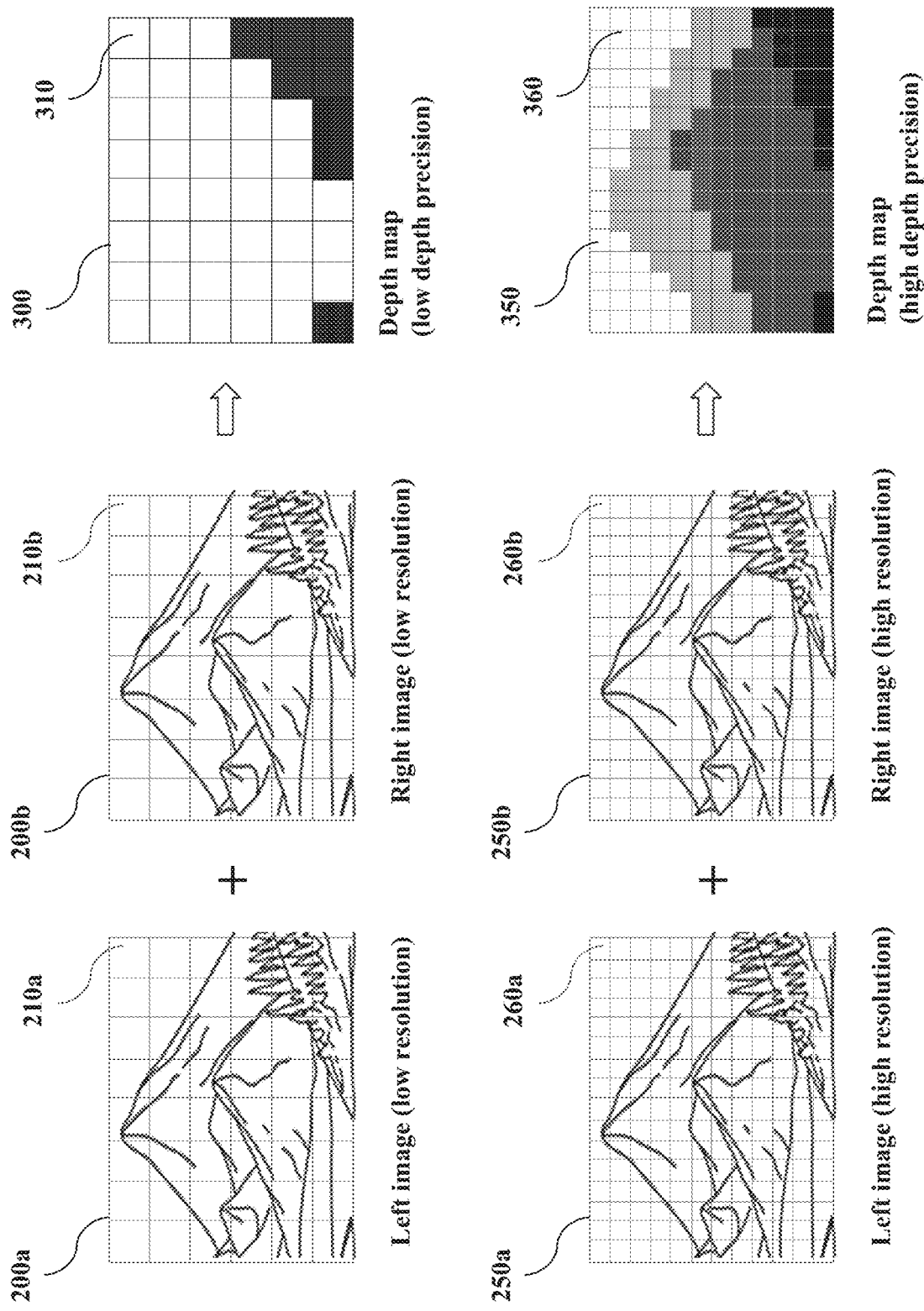
FIG. 4 is an exemplary diagram illustrating a method of determining a depth map using a pair of corresponding images.

Turning now to FIG. 4, a construction of a depth map from left and right images acquired by binocular imaging is shown. The top of FIG. 4 shows a low resolution left image 200a (for example, 320×240 pixels 210a) and a low resolution right image 200b (for example, 320×240 pixels 210b). A corresponding low resolution depth map 300, which shows object distance at each pixel 310 (darker pixels here correspond to closer objects), can be constructed from the low resolution left and right images 200a, 200b. For example, a given pixel 210a of the low resolution left image 200a can be used to search for a corresponding pixel 210b in the low resolution right image 200b. Alternatively, and/or additionally, a given pixel 210b of the low resolution right image 200b can (by symmetry) be used to search for a corresponding pixel 210a in the low resolution left image 200a. Corresponding pixels within the low resolution images 200a, 200b can be located using, for example, local block matching techniques and/or global optimization techniques.

In some embodiments, the low resolution left and right images 200a, 200b can be rectified prior to searching for pixel correspondence, so as to improve search performance. For example, the left and right images 200a, 200b can be rotated such that the horizontal axes of the images are parallel to each other. The left and right images 200a, 200b can be rectified prior to performing depth measurement precision, as described herein.

After a corresponding pixel is located, a disparity d can be found between corresponding pixels. The disparity d can be represented as a number of pixels or as an absolute distance (where the distance width of each pixel is known). As each pixel 210a, 210b produces a depth measurement for a corresponding pixel 310 in the low resolution depth map 300, the x-y resolution of the low resolution depth map 300 is dependent on the x-y resolution of the image pair 200a, 200b. Similarly, the depth precision of the low resolution depth map 300 is also dependent on the x-y resolution of the image pair 200a, 200b, as the depth precision is determined by the granularity of the disparity d. Thus, the low resolution images 200a, 200b can generate a corresponding low resolution depth map 300.

Depth precision of a depth map can be increased using higher resolution binocular image pairs (for example, 640×480 pixels rather than 320×240 pixels). As shown in FIG. 4, a high resolution depth map 350 can be constructed from high resolution left and right images 250a, 250b. For example, a given pixel 260a of the high resolution left image 250a can be used to search for a corresponding pixel 260b in the high resolution right image 250b. Alternatively, and/or additionally, a given pixel 260b of the high resolution right image 250b can (by symmetry) be used to search for a corresponding pixel 260a in the high resolution left image 250a. In some embodiments, the high resolution left and right images 250a, 250b can be rectified prior to searching for pixel correspondence, so as to improve search performance.

Values of disparity d for each pair of corresponding pixels can be used to produce a high resolution depth map 350, where each pixel 360 of the high resolution depth map 350 conveys the disparity d for a given location. In this example, the disparity d in the high resolution depth map 350 has twice the precision of the low resolution depth map 300, since the disparity range for any given object distance is represented by twice the number of pixels. However, to achieve this two-fold increase in depth precision, computational intensity increased by a factor of 8 because pixel correspondence is searched in the x, y, and depth dimensions.

Figure 5:
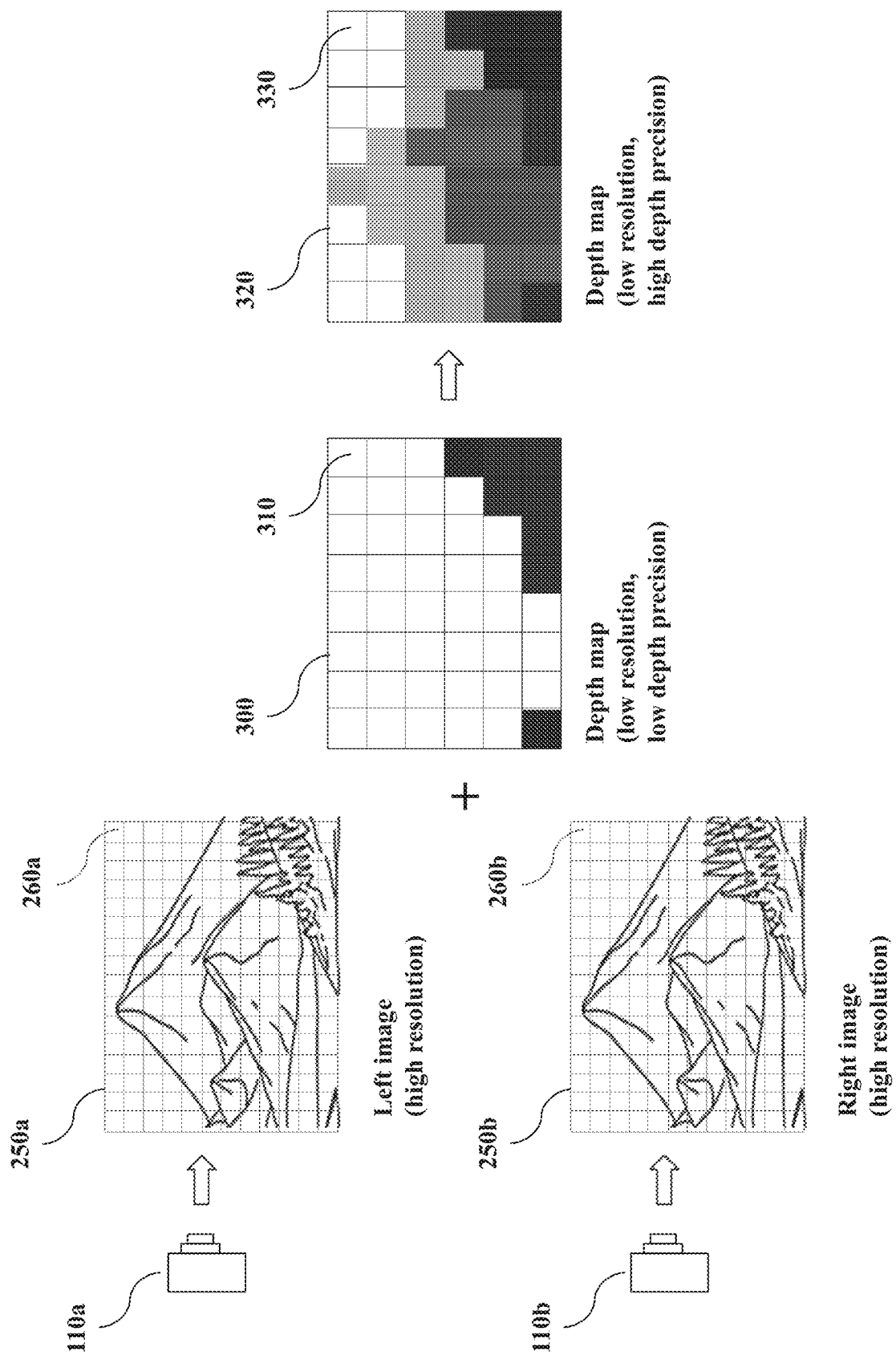
FIG. 5 is an exemplary diagram illustrating a method for determining a depth map using a lower resolution depth map and a pair of corresponding images.

Turning now to FIG. 5, an improved construction of a depth map from high resolution left and right images 250a, 250b acquired by binocular imaging is shown. The improved depth map construction uses as an input a low resolution depth map 300 that has a lower resolution relative to the high resolution images 250a, 250b. In some embodiments, the resolution of the high resolution images 250a, 250b can be an integer multiple of the resolution of the low resolution depth map 300. For example, the resolution of the high resolution images 250a, 250b can be 640×480 pixels, while the resolution of the low resolution depth map 300 can be 320×240 pixels. In some embodiments, the high resolution images 250a, 250b can have the same aspect ratio (for example, three by two or four by three) as the low resolution depth map 300. In other embodiments, the high resolution images 250a, 250b can have a different aspect ratio as the low resolution depth map 300.

The low resolution depth map 300 can be obtained using any means. For example, the low resolution depth map 300 can be acquired from low resolution images 200a, 200b (shown in FIG. 4) having the same low resolution as the low resolution depth map 300. For example, a 320×240 pixel low resolution depth map 300 can be acquired from 320× 240 pixel resolution images through stereopsis, as discussed above with reference to FIG. 4. In some embodiments, the low resolution images 200a, 200b can be acquired using the same imaging devices 110 that are used to acquire the high resolution images 250a, 250b. For example, a 320×240 pixel resolution images can be acquired using an imaging device 110 having a 640×480 pixel or higher resolution. An initial 640×480 pixel image acquired by the imaging device 110 can be scaled down in resolution to a 320×240 pixel resolution using suitable images processing techniques (for example, averaging over pixels). In other embodiments, the low resolution images 200a, 200b and the high resolution images 250a, 250b can be acquired using different imaging devices 110. For example, one or more 320×240 resolution imaging devices 110 can be used to acquire 320×240 pixel resolution images, while separate 640×480 pixel resolution imaging devices 110 can be used to acquire 640×480 pixel resolution images.

In some embodiments, the low resolution depth map 300 can be obtained using the present systems and methods by a "bootstrapping" process using, as input, a depth map having a still lower resolution, as well as a pair of low resolution images 200a, 200b having the same resolution as the low resolution depth map 300a. For example, a 320×240 pixel depth map can be constructed from a 160×120 pixel depth map, as well as a pair of images 200a, 200b having a 320×240 pixel resolution. The bootstrapping process can continue for multiple iterations. For example, a 160×120 pixel resolution depth map can be constructed from a 80×60 pixel depth map, as well as a pair of images having a 160×120 pixel resolution, and so forth. In some embodiments, a pair of images can be used as input for multiple levels of this bootstrapping process. For example, a given pair of 640×480 pixel resolution images 250a, 250b can be processed to reduce resolution to 320×240 pixels as input for one level of the bootstrapping process, reduced to a resolution of 160×120 pixels for a subsequent level of the process, and so forth. This bootstrapping process advantageous enables efficient scaling for obtaining more precise depth measurements during stereoscopic imaging.

Figure 6:
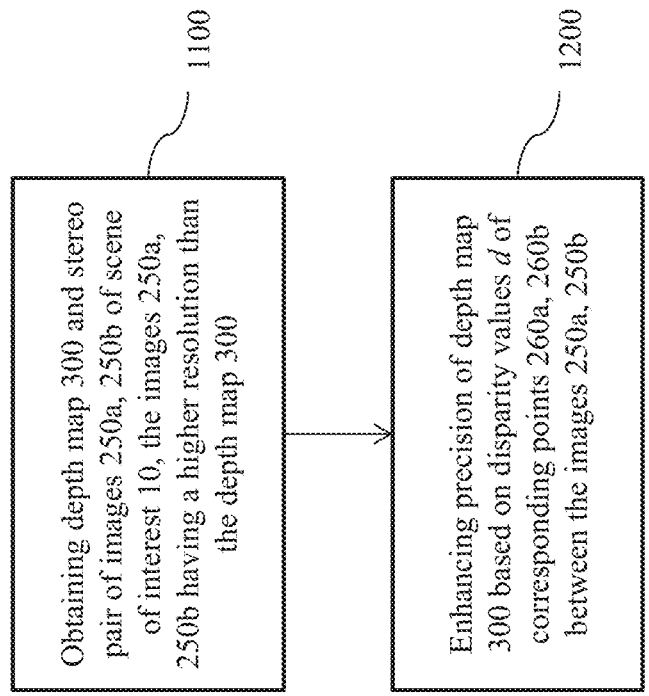
FIG. 6 is an exemplary flow chart illustrating the method of FIG. 5 for determining a depth map using a lower resolution depth map and a pair of corresponding images.

Accordingly, turning now to FIG. 6, a method 1000 is shown for efficiently enhancing stereoscopic depth measurement precision using the above-described techniques. At 1100, a low resolution depth map 300 and a stereo pair of high resolution images 250a, 250b of a scene of interest 10 are obtained, the high resolution images 250a, 250b having a higher resolution than the low resolution depth map 300. The high resolution images 250a, 250b can be obtained, for example, using a pair of imaging devices 110a, 110b, as discussed above in reference to FIGS. 1-3. The depth map 300, which has a lower resolution than the images 200a, 200b, can be obtained using any suitable means, as described above with reference to FIG. 5. At 1200, the precision of the depth map 300 is enhanced based on disparity values d of corresponding points 210a, 210b between the images 200a, 200b.

Corresponding pixels 260a, 260b between the images 250a, 250b can be identified and/or acquired using any suitable method, such as machine vision and/or artificial intelligence methods, and the like. Suitable methods include feature detection, extraction and/or matching techniques such as RANSAC (RANdom SAmple Consensus), Shi & Tomasi corner detection, SURF blob (Speeded Up Robust Features) detection, MSER blob (Maximally Stable Extremal Regions) detection, SURF (Speeded Up Robust Features) descriptors, SIFT (Scale-Invariant Feature Transform), FREAK (Fast REtinA Keypoint) descriptors, BRISK (Binary Robust Invariant Scalable Keypoints) descriptors, HOG (Histogram of Oriented Gradients) descriptors, and the like. Size and shape filtered can be applied to identify corresponding pixels 260a, 260b between the images 250a, 250b, as desired.

Figure 7:
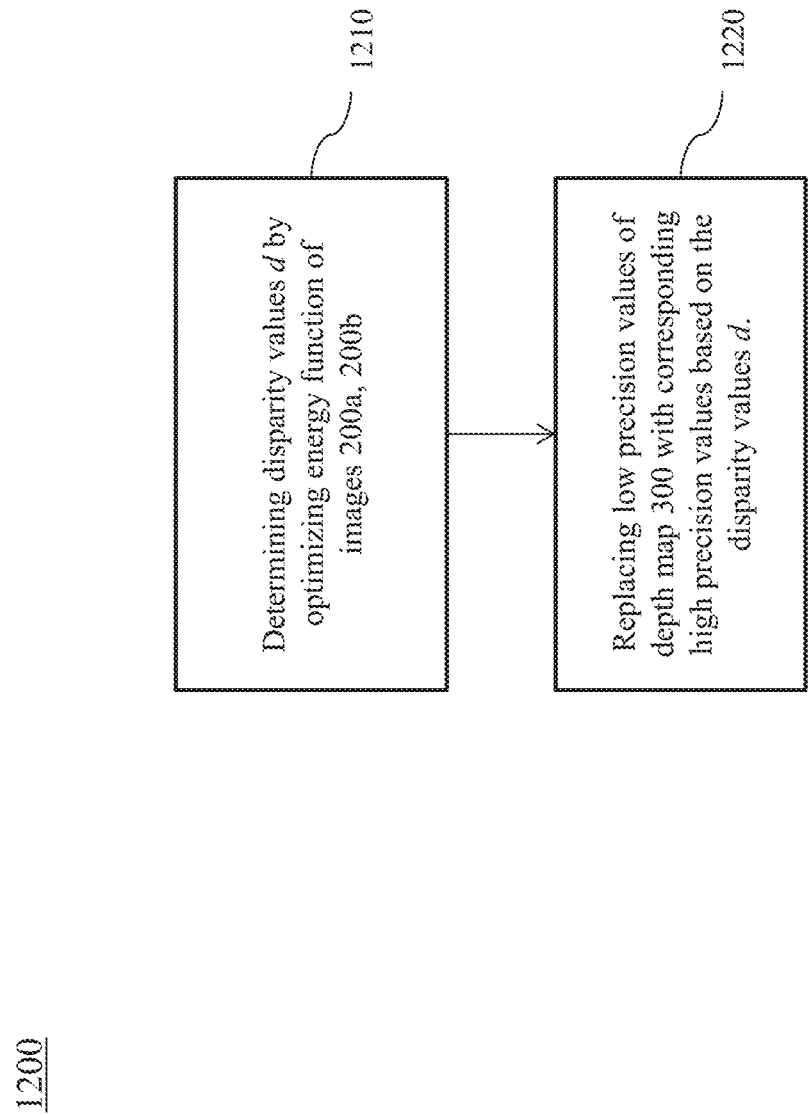
FIG. 7 is an exemplary flow chart illustrating an embodiment of the method of FIG. 6, wherein disparity values are determined by optimizing an energy function.

Turning now to FIG. 7, step 1200 is shown in more detail for enhancing the precision of a depth map 300 based on disparity values d. At 1210, the disparity values d can be determined by optimizing an energy function E(d) (also known as a cost function or objective function) of the images 200a, 200b. An exemplary energy function is shown in Equation (5):

$$E(d)=E_d(d)+pE_s(d) \qquad \text{Equation (5)}$$

wherein $E_d(d)$ is a similarity component reflecting correspondences between pixel intensities of the images 200a, 200b, $E_s(d)$ is a smoothness component reflecting continuity of depth transitions between elements of the depth map 300, and p is a weighing term. The energy function E(d) is a function of the disparity values d of the depth map 300, such that optimizing the energy function E(d) can yield disparity values d that best reflect actual distances of objects imaged. In some embodiments, the similarity component E(d) can include a sum of absolute differences (SAD) of a pixel dissimilarity metric, such as a Birchfield-Tomasi (BT) pixel dissimilarity metric. An exemplary similarity component $E_d(d)$ that includes a sum of absolute differences of a Birchfield-Tomasi pixel dissimilarity metric $E_{d_{BT-SAD}}$ is shown in Equations (6)-(10) below:

$$E_d(d) = \sum_{x,y} E_{d_{BT-SAD}}(x, y, d(x, y) = d) \quad \text{Equation (6)}$$

$$E_{d_{BT-SAD}}(x, y, d(x, y) = d) = \sum \min\{C_1, C_2\} \quad \text{Equation (7)}$$

$$E_{d_{BT}}(x, y, d(x, y) = d) = \min\{C_1, C_2\} \quad \text{Equation (8)}$$

$$C_1 = \min_{x-d-0.5 \leq x' \leq x-d+0.5} |I_L(x) - I_R(x')| \quad \text{Equation (9)}$$

$$C_2 = \min_{x-0.5 \leq x' \leq x+0.5} |I_L(x') - I_R(x-d)| \quad \text{Equation (10)}$$

wherein x and y are pixel coordinates, d is the disparity, $I_L$ is an array of image pixel intensities of a left image 200a, and $I_R$ is an array of image pixel intensities of a right image 200b. Although a Birchfield-Tomasi pixel dissimilarity metric is shown herein for illustrative purposes only, any suitable pixel dissimilarity metric can be used for the present systems and methods.

In some embodiments, the smoothness component $E_s(d)$ can be based on a sum of trigger functions. An exemplary smoothness component $E_s(d)$ that is based on a sum of trigger functions is shown in Equation (11) below:

$$E_{smoothness}(d) = \Sigma p_1 T(|d(x,y) - d(x',y')| == 1) + p_2 T(|d(x,y) - d(x',y')| > 1) \quad \text{Equation (11)}$$

wherein T is a trigger function, $p_1$ and $p_2$ are weighing terms, and the sum is taken over neighboring pixels (for example, four neighboring pixels) of a pixel at pixel coordinates (x, y). Although a smoothness component $E_s(d)$ based on a sum of trigger functions is shown herein for illustrative purposes only, any suitable smoothness component $E_s(d)$ can be used for the present systems and methods.

At 1220, low precision values of the depth map 300 can be replaced with corresponding high precision depth values based on the disparity values d determined at 1210. In some embodiments, all low precision values of the depth map 300 can be replaced with corresponding high precision depth values. In some embodiments, some, but not all low precision values of the depth map 300 can be replaced with corresponding high precision depth values. In some embodiments, selected low precision values of the low precision depth map 300 can be replaced with corresponding high precision values based on the low precision values being within a predetermined threshold disparity $d_T$. In some embodiments, the threshold disparity $d_T$ can correspond to a predetermined threshold distance $D_T$.

The method of replacing low precision values with high precision values in a depth map 300 is illustrated with reference to FIG. 8. An exemplary depth map 300 is shown on the left side of FIG. 8 as including pixels 310 having low depth precision. In particular, the low precision pixels 310 of the depth map 300 include low precision distant pixels 310a (light) and low precision nearby pixels 310b (dark). In one embodiment, shown in the upper right portion of FIG. 8, all of the low precision pixels 310 of the depth map 300 are replaced with high precision pixels 330, regardless of whether the pixel is a distant pixel 310a or a nearby pixel 310b. Accordingly, the low precision distant pixels 310a are resolved into high precision pixels 330a, 330b, and the low precision nearby pixels 310b are resolved into high precision pixels 330c, 330d.

Figure 8:
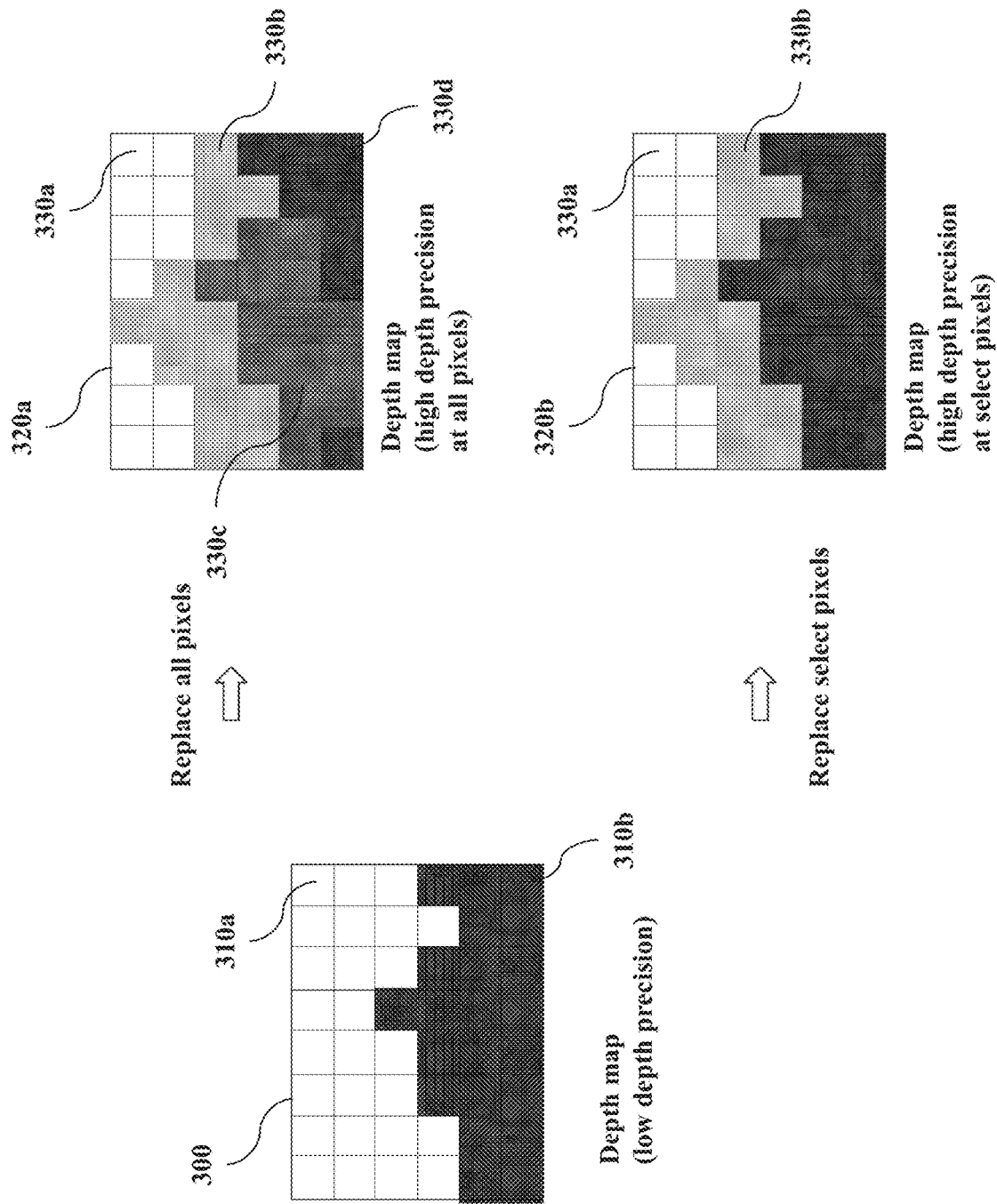
FIG. 8 is an exemplary diagram illustrating another embodiment of the method of FIG. 6, wherein pixels of a low resolution depth map are replaced with high precision values.

In another embodiment, shown in the lower right portion of FIG. 8, only select low precision pixels 310 of the depth map 300 are replaced with high precision pixels 330. Low precision pixels 310 can be selectively replaced based on whether the pixel is a distant pixel 310a or a nearby pixel 310b. In particular, low resolution distant pixels 310a can advantageously be selectively replaced with high resolution pixels 330, thereby increasing depth precision for distant objects of interest while avoiding costs of precision enhancement for nearby objects. Accordingly, the low precision distant pixels 310a are resolved into high precision pixels 330a, 330b, while the intensities of low precision nearby pixels 310b are unaffected. A predetermined threshold disparity $d_T$ can be used as a cutoff value for selecting which low precision pixels 310 to replace. The threshold disparity $d_T$ can take any suitable value, depending on the application, the desired level of depth precision, and the imaging resolution. Exemplary threshold disparity $d_T$ values include 1 pixel, 2 pixels, 4 pixels, 6 pixels, 8 pixels, 10 pixels, 12 pixels, 20 pixels, 40 pixels, 60 pixels, 80 pixels, 100 pixels, and an even greater number of pixels.

In some embodiments, the efficiency of enhancing depth precision can be improved by optimizing the energy function E(d) over a predetermined range of disparity values d (rather than, for example, optimizing over all possible disparity values d). In some embodiments, the energy function can be optimized over a range of disparity values that are within a predetermined disparity threshold $d_T$. The predetermined disparity threshold $d_T$ can correspond, for example, to a predetermined threshold distance $D_T$. For example, to resolve distance measurements for distant objects, a disparity threshold $d_T$ of 8 pixels can be preset that corresponds to objects of, for example, 100 meters or greater from the imaging device. Accordingly, only disparities between 0 pixels to 7 pixels are sampled when optimizing the data term E(x, y, d) with respect to the disparity d. Optimization of the energy function E(d) over a predetermined range of disparity values d can advantageously reduce computational costs.

Figure 9:
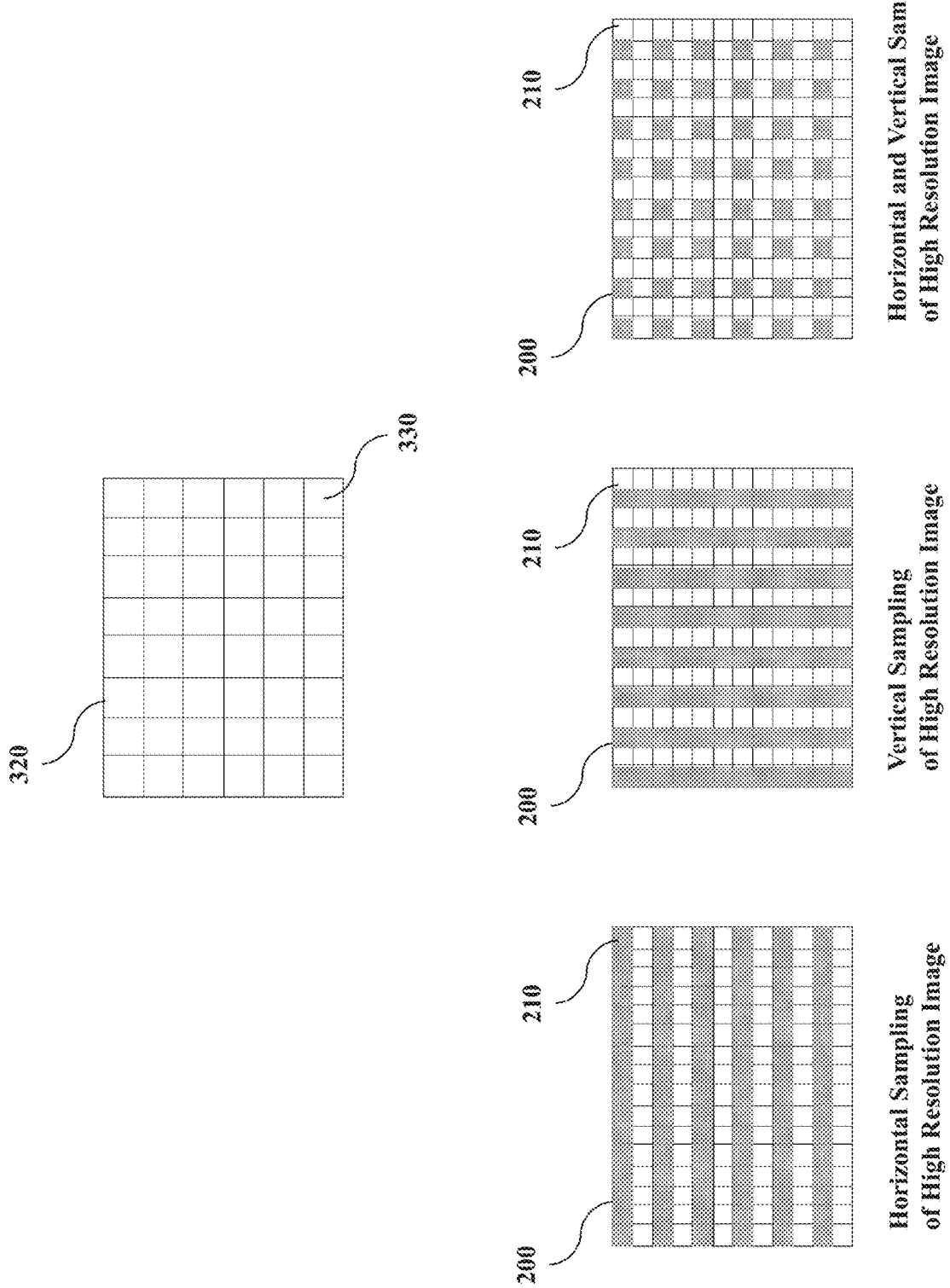
FIG. 9 is an exemplary diagram illustrating another embodiment of the method of FIG. 6, wherein precision of a depth map is enhanced using interval sampling

In some embodiments, the efficiency of enhancing depth precision can be improved by optimizing the energy function E(d) using an interval sampling technique, as illustrated in FIG. 9. The interval sampling of an image 200 can be based on a resolution of a depth map 300. The top of FIG. 9 shows an exemplary low precision depth map 300 (for example, a 320×240 pixel depth map). The bottom of FIG. 9 shows three exemplary ways of interval sampling a high resolution image 200 (for example, a 640×480 pixel image) based on the lower resolution of the depth map 300. In some embodiments, the high resolution image 200 can be sampled horizontally. Here, horizontal sampling of the exemplary 640×480 pixel image based on the 320×240 pixel depth map yields sampling every other row of pixels 210. In some embodiments, the high resolution image 200 can be sampled vertically. Here, vertical sampling of the exemplary 640×480 pixel image based on the 320×240 pixel depth map yields sampling every other column of pixels 210. In some embodiments, the high resolution image 200 can be sampled both horizontally and vertically. Here, horizontal and vertical sampling of the exemplary 640×480 pixel image based on the 320×240 pixel depth map yields sampling the of pixels 210 in a grid-like pattern, as shown. More generally, for a low resolution depth map of dimensions $(w_1, h_1)$ and a high resolution image of dimensions ($w_2$, $h_2$), interval sampling of a data term E(x, y, d) can be represented as:

$$E(x, y, d), x \in \left\{ x_i \mid \mod\left(x_i, \frac{w2}{w1}\right) = 0, \mod\left(y_i, \frac{h2}{h1}\right) = 0 \right\} \quad \text{Equation (12)}$$

The energy function E(d) can be optimized using any suitable technique. In some embodiments, the energy function E(d) can be optimized using dynamic programming. An exemplary dynamic programming technique is based on the recurrence relation below:

$$L(x, y, d) = \quad \text{Equation (13)}$$
$$E_s(x, y, d) + \min\{L(x-1, y, d), L(x-1, y, d-1) + p_1,$$
$$L(x-1, y, d+1) + p_1, \min_{d'} L(p-1, y, d') + p_2\} -$$
$$\min_{d'} L(x-1, y, d')$$

wherein optimal values of the disparity d* can be given by:

$$d^* = \text{argmin}_d \Sigma L(x,y,d) \quad \text{Equation (14)}$$

In some embodiments, the energy function E(d) can be further optimized using non-local optimization. An exemplary non-local optimization is recursive filtering. In some embodiments, non-local optimization of the energy function E(d) can be performed according to Equation (15) as follows:

$$E(d) = \Sigma|d(x,y) - d^*(x,y)|^2 + \Sigma \exp(|I_L(x,y) - I_L(x',y')| + |x' - x| + |y' - y|)|d(x,y) - d(x'y')| \quad \text{Equation (15)}$$

Figure 10:
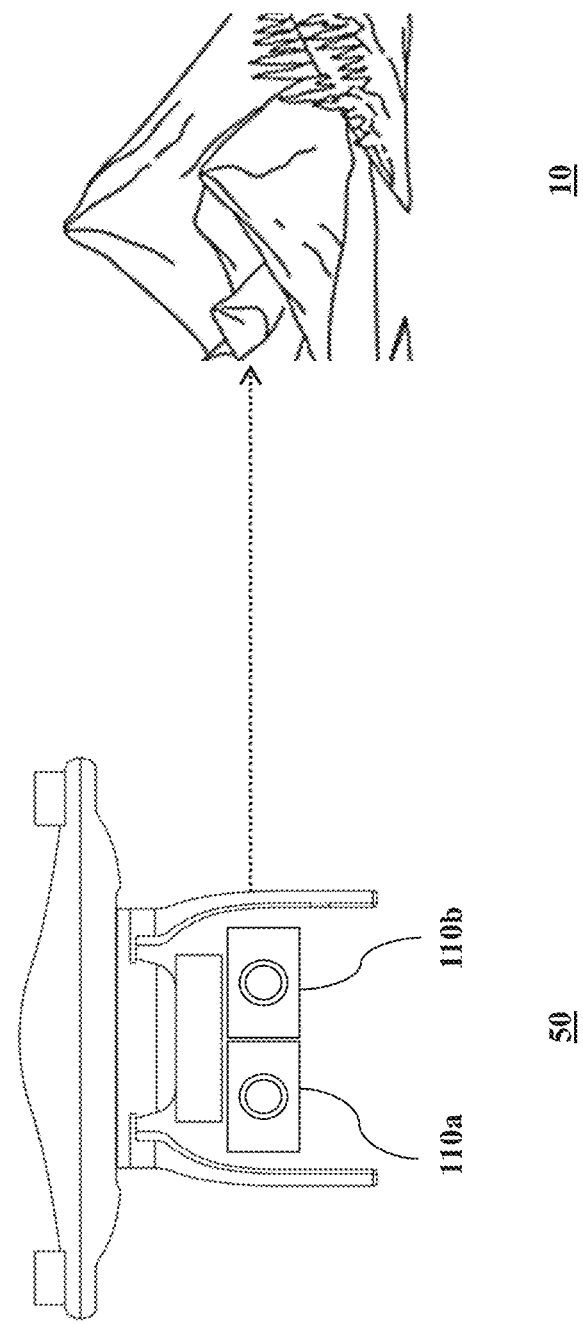
FIG. 10 is an exemplary diagram illustrating an embodiment of the stereoscopic imaging system of FIG. 1, as mounted aboard an unmanned aerial vehicle.

Depth precision enhancement according to the present systems and methods can be used for images taken by mobile platforms. In some embodiments, the mobile platform is an unmanned aerial vehicle (UAV) 50, as shown in FIG. 10, showing imaging devices 110a, 110b mounted aboard the UAV 50 for imaging a scene of interest 10. UAVs 50, colloquially referred to as "drones," are aircraft without a human pilot onboard the vehicle whose flight is controlled autonomously or by a remote pilot (or sometimes both). UAVs 50 are now finding increased usage in civilian applications involving various aerial operations, such as data-gathering or delivery. The present depth precision enhancement systems and methods are suitable for use with many types of UAVs 50 including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs. Other suitable mobile platforms for use with the present video synchronization systems and methods include, but are not limited to, bicycles, automobiles, trucks, ships, boats, trains, helicopters, aircraft, various hybrids thereof, and the like.

Example 1

Figure 11:
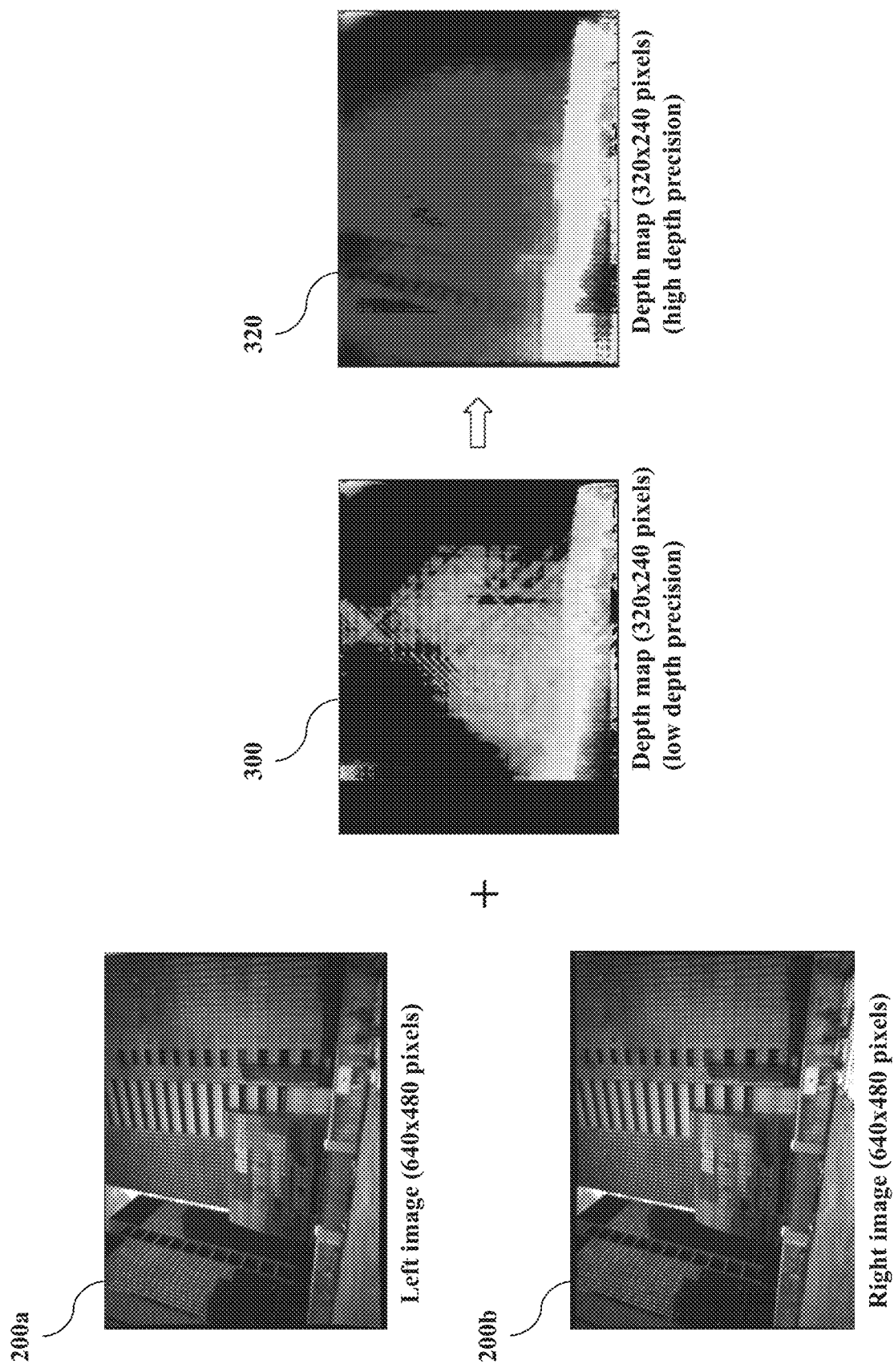
FIG. 11 is an exemplary diagram illustrating experimental results obtained using the method of FIG. 5 for determining a depth map using a lower resolution depth map and a pair of corresponding images.

Turning now to FIG. 11, an example of depth precision enhancement using the present systems and method is shown. Left and right high resolution images 200a, 200b having 640×480 pixel resolutions and a low precision depth map 300 having a 320×240 pixel resolution are used as inputs. A high precision depth map 320 is shown as the output, which has visibly greater depth resolution than the input depth map 300. In this example, the present depth enhancement technique improved performance over prior techniques by 25%.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method of distance measuring, comprising:
    obtaining a depth map and a stereo pair of images of a scene of interest, the images having a higher resolution than the depth map; and
    enhancing a precision of the depth map based on disparity values of corresponding points between the images, including:
        determining the disparity values by optimizing an energy function of the images, the energy function including a smoothness component reflecting continuity of depth values within the depth map, wherein the smoothness component is a weighted sum of trigger functions, each of the trigger functions being a function of a disparity difference between a disparity value corresponding to a pixel within the depth map and a disparity value corresponding to one of a plurality of neighboring pixels of the pixel within the depth map; and
        replacing low precision values of the depth map with corresponding high precision values based on the disparity values.

2. The method of claim 1, wherein optimizing the energy function includes optimizing the energy function by interval sampling the images.

3. The method of claim 2, wherein interval sampling the images include at least one of horizontally interval sampling the images or vertically interval sampling the image.

4. The method of claim 2, wherein interval sampling the images includes interval sampling the images at a resolution of the depth map.

5. The method of claim 2, wherein interval sampling the images includes determining a similarity component of the energy function using interval sampling.

6. The method of claim 1, wherein optimizing the energy function includes optimizing the energy function over a predetermined range of disparity values.

7. The method of claim 6, wherein optimizing the energy function over the predetermined range of disparity values includes optimizing the energy function over a range of disparity values within a predetermined disparity threshold.

8. The method of claim 7, wherein optimizing the energy function over the range of disparity values within the predetermined disparity threshold includes optimizing the energy function over a range of disparity values within a predetermined disparity threshold that corresponds to a predetermined threshold distance.

9. The method of claim 1, wherein optimizing the energy function includes optimizing the energy function using at least one of dynamic programming or non-local optimization.

10. The method of claim 9, wherein optimizing the energy function includes optimizing the energy function using recursive filtering.

11. The method of claim 1, wherein replacing the low precision values of the depth map with the corresponding high precision values includes at least one of:
  replacing all low precision values of the depth map with corresponding high precision values;
  replacing selected low precision values of the depth map with corresponding high precision values based on the low precision values being within a predetermined threshold disparity; or
  replacing selected low precision values of the depth map with corresponding high precision values based on the low precision values being within a disparity range that corresponds to a predetermined threshold distance.

12. The method of claim 1, wherein:
  the stereo pair of images are a first stereo pair of images of the scene of interest; and
  obtaining the depth map includes obtaining the depth map from a second stereo pair of images of the scene of interest, the second stereo pair of images having a same resolution as the depth map.

13. The method of claim 12, wherein:
  the depth map is a first depth map; and
  obtaining the first depth map includes obtaining the first depth map from the second stereo pair of images and a second depth map having a lower resolution than the second stereo pair of images.

14. The method of claim 1, further comprising:
  rectifying the stereo pair of images prior to enhancing the precision of the depth map.

15. An imaging system, comprising:
  a pair of imaging devices configured to obtain a stereo pair of images of a scene of interest; and
  one or more processors configured to enhance a precision of a depth map of the scene of interest based on disparity values of corresponding points between the images, the images having a higher resolution than the depth map, and enhancing the precision of the depth map includes;
    determining the disparity values by optimizing an energy function of the images, the energy function including a smoothness component reflecting continuity of depth values within the depth map, wherein the smoothness component is a weighted sum of trigger functions, each of the trigger functions being a function of a disparity difference between a disparity value corresponding to a pixel within the depth map and a disparity value corresponding to one of a plurality of neighboring pixels of the pixel within the depth map; and
    replacing low precision values of the depth map with corresponding high precision values based on the disparity values.

16. A non-transitory computer readable storage medium, comprising:
  instruction for obtaining a depth map and a stereo pair of images of a scene of interest, the images having a higher resolution than the depth map; and
  instruction for enhancing a precision of the depth map based on disparity values of corresponding points between the images, including:
    instruction for determining the disparity values by optimizing an energy function of the images, the energy function including a smoothness component reflecting continuity of depth values within the depth map, wherein the smoothness component is a weighted sum of trigger functions, each of the trigger functions being a function of a disparity difference between a disparity value corresponding to a pixel within the depth map and a disparity value corresponding to one of a plurality of neighboring pixels of the pixel within the depth map; and
    instruction for replacing low precision values of the depth map with corresponding high precision values based on the disparity values.

17. The method of claim 1, wherein the energy function further includes a similarity component reflecting correspondences between pixel intensities of the images.

18. The method of claim 17, further comprising:
  determining the similarity component based on a sum of absolute differences of a pixel dissimilarity metric.

19. The method of claim 18, wherein determining the sum of the absolute differences of the pixel dissimilarity metric includes determining a sum of absolute differences of a Birchfield-Tomasi pixel dissimilarity metric.

20. The method of claim 1, wherein a first weight is applied to one or more of the trigger functions of disparity differences that are equal to a non-zero threshold, and a second weight is applied to another one or more of the trigger functions of disparity differences that are larger than the non-zero threshold.

* * * * *